United States Patent [19]
Farley et al.

[11] Patent Number: 5,437,145
[45] Date of Patent: Aug. 1, 1995

[54] FEEDER ASSEMBLY COUPLING STRUCTURE FOR AN AGRICULTURAL HARVESTER

[75] Inventors: Herb M. Farley, Braidwood; Richard A. Hardesty, Palatine, both of Ill.

[73] Assignee: Case Corporation, Racine, Wis.

[21] Appl. No.: 108,917

[22] Filed: Aug. 19, 1993

[51] Int. Cl.6 .............................................. A01D 41/06
[52] U.S. Cl. ....................... 56/15.6; 56/218; 56/DIG. 14; 460/119; 403/14
[58] Field of Search ........................ 56/15.6, 15.9, 218, 56/228, DIG. 14; 460/70, 119; 403/13, 14, 79, 150, 119

[56] References Cited

U.S. PATENT DOCUMENTS

| | | | |
|---|---|---|---|
| 2,478,591 | 8/1949 | Miller | 56/DIG. 14 X |
| 2,494,757 | 1/1950 | Hansen | 56/DIG. 14 X |
| 3,116,075 | 12/1963 | Hershman et al. | 280/479 |
| 3,324,637 | 6/1967 | Ashton et al. | 56/21 |
| 3,559,384 | 2/1971 | Bernhardt et al. | 56/20 |
| 3,665,688 | 5/1972 | Sheehan et al. | 56/14.6 |
| 3,699,754 | 10/1972 | Koch et al. | 56/15.8 |
| 3,958,399 | 5/1976 | Schoeneberger | 56/15.8 |
| 4,786,202 | 11/1988 | Arnold et al. | 403/79 |
| 5,157,905 | 10/1992 | Talbot et al. | 56/15.9 |

Primary Examiner—Terry Lee Melius
Attorney, Agent, or Firm—Rudnick & Wolfe

[57] ABSTRACT

The present invention concerns a self-aligning coupling structure for releasably connecting a rear end of a feeder assembly to a frame of an agricultural harvester such as a combine and the like. The self-aligning coupling structure includes a pair of releasable couplings laterally spaced from each other on opposite sides of the feeder assembly and combine frame. Each releasable coupling includes first and second apertured coupling elements. One of the apertured coupling elements is provided on and extends from the combine frame while the other apertured coupling element is provided on and extends from a housing of the feeder assembly. The coupling elements each have complementary guide surfaces provided thereon. When the feeder assembly is to be coupled to the combine frame, the guide surfaces on the respective coupling elements of each releasable coupling cooperate with each other to self-align both horizontally and vertically the apertures in the coupling elements relative to each other thereby facilitating the passage of a pivot pin through the aligned apertures so as to releasably connect the feeder assembly to the combine frame for pivotal movement about the axis of the pivot pins.

14 Claims, 3 Drawing Sheets

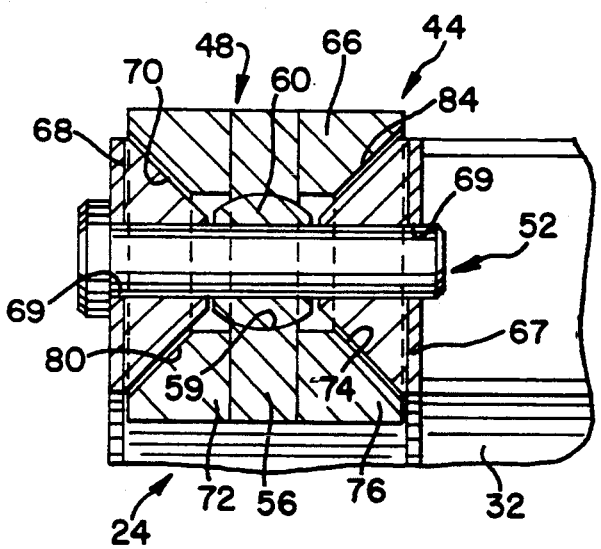
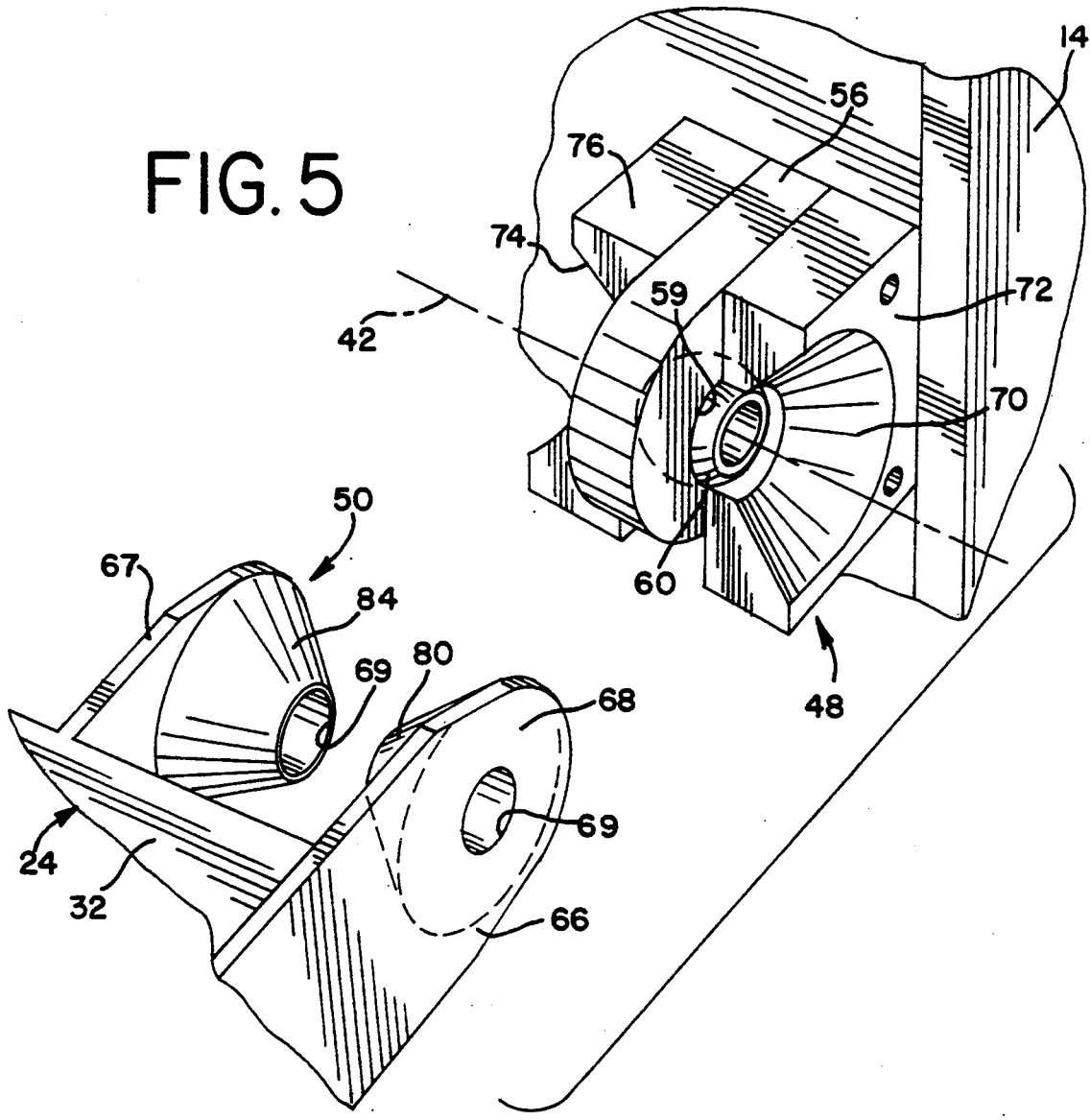

FEEDER ASSEMBLY COUPLING STRUCTURE FOR AN AGRICULTURAL HARVESTER

FIELD OF THE INVENTION

The present invention generally relates to agricultural harvesters such as combines and the like having a feeder assembly connected at one end thereof, and, more particularly, to a coupling assembly for releasably coupling the feeder assembly to a frame of the agricultural harvester.

BACKGROUND OF THE INVENTION

The present invention is particularly but not exclusively designed for use with combines. A typical combine includes a header assembly connected to a forward end of a feeder assembly. The header assembly cuts and moves crop materials toward the feeder assembly which transfers the crop materials to a suitable threshing assembly on the combine. To facilitate transportation of the combine and proper positioning of the header assembly relative to changing ground contours, the feeder assembly and header assembly are elevationally movable in unison about a pivotal connection whereat a rear end of the feeder assembly is connected to the frame of the combine.

As will be appreciated by those skilled in the art, both the header assembly and feeder assembly are comprised of a plurality of structural components which combine together to move the crop materials toward the threshing assembly on the combine. The header assembly normally comprises a reel, a cutting mechanism, a housing for mounting the reel and curing mechanism and an elongated auger spaced rearwardly of the reel and cutting mechanism for consolidating the crop inwardly toward a discharge opening defined by the housing of the header assembly. The feeder assembly typically includes a housing which envelopes a conveyor assembly. A typical conveyor assembly for a combine feeder assembly includes front and rear rotary members, about which a chain and slat conveyor is entrained. A lift mechanism including a linearly distendable driver is typically connected between the feeder assembly housing and the frame of the combine for elevationally positioning the feeder assembly and header assembly relative to the frame of the combine.

Different header assembly designs, which vary significantly in width and weight, are used on combines depending upon the crop and depending upon land conditions. Moreover, when the combine is initially assembled in the factory or disassembled for field service activity, it is common practice to detach the feeder/header assembly combination from the frame of the combine. It is advantageous, therefore, for the feeder assembly to be connected to the combine frame in a manner permitting the feeder/header assembly to be connected and disconnected from the combine frame in a relatively short period of time.

A rear end of the feeder assembly is conventionally connected to the combine frame as with pivot pins which define the pivot axis for the feeder assembly. Apertured bracket assemblies provided on opposite sides of the feeder assembly are typically used to connect the feeder assembly to the frame of the combine. The apertures on the feeder assembly bracket assemblies must be aligned both vertically and horizontally relative to apertures on the combine frame before the feeder assembly can be coupled to the combine frame.

As will be appreciated, considerable time, effort and exertion is required on the part of the operator to effect connection of the feeder assembly to the combine frame. The unwieldy size and excessive weight of the feeder/header assembly combination further exacerbates the alignment problems associated with connection of the feeder assembly to the combine frame.

Thus, there is a need and a desire for a coupling assembly which readily permits connection and disconnection of the feeder assembly to the combine frame in a manner reducing the amount of time, effort and exertion required by the operator to connect the feeder assembly to the combine frame.

SUMMARY OF THE INVENTION

In view of the above, and in accordance with the present invention, there is provided an agricultural harvester including a main body or frame, with a feeder assembly and header assembly combination connected thereto. A salient feature of the present invention concerns a self-aligning coupling assembly for releasably connecting a rear end of the feeder assembly to the main body of the harvester for vertical movement about a fixed axis.

The self-aligning coupling assembly of the present invention includes a pair of releasable couplings laterally spaced from each other on opposite sides of the combine frame and a housing of the feeder assembly. Each releasable coupling includes first and second complementary coupling elements. One of the coupling elements is fixed to the frame and the other is fixed to the feeder housing. The coupling elements have complementary guide surfaces thereon. When the feeder assembly is to be connected to the combine frame, the guide surfaces on the respective coupling elements engage with each other to self-align, both vertically and horizontally, the apertures defined by each of the coupling elements relative to each other thereby facilitating passage of a pivot pin through the aligned apertures so as to releasably connect the feeder assembly to the frame for pivotal movement about the axis of the pivot pin.

In a most preferred form of the invention, the guide surface on the first coupling element of each releasable coupling includes slanted surface configurations provided on opposite lateral sides with a predetermined lateral spacing therebetween. Each slanting surface configuration has a general vertical orientation that is centered upon and converges toward the aperture defined by the first coupling element. The guide surface on the second coupling element of each releasable coupling includes slanted and laterally spaced surface configurations provided on opposite lateral sides of the second coupling element. The lateral spacing therebetween is complementary to the predetermined lateral spacing between the slanted surface configurations on the first coupling element. The slanting surface configurations on the second coupling element likewise have a generally vertical orientation and are centered upon and converge toward the aperture defined by the second coupling element.

According to the present invention, each guide surface on the coupling elements has a frustoconical configuration. In the illustrated embodiment, the guide surface on the coupling element connected to the frame of the harvester extends rearwardly of and approximately 180° about the longitudinal axis of the pivot pin.

That is, the guide surfaces on the coupling elements provided on the combine frame have a profiled configuration which extends partially above, partially below and rearwardly of the pivot axis defined by the pivot pin. As the feeder assembly is connected to the combine frame, the guide surfaces on the coupling elements coact with each other such that like radial profiles on the elements ultimately align the apertures therein to facilitate passage of the pivot pin therethrough. The portion of the coupling element extending below the pivot axis supports the feeder housing and inhibits it from dropping when the pivot pins are removed from coupling assembly. Moreover, the 180° configuration of the coupling element on the frame of the combine opens to the forward end thereof to facilitate assembly of the feeder assembly to the frame of the combine.

The present invention utilizes a simple geometric design on each of the coupling elements to effect self-alignment of the apertures defined by the coupling elements thereby permitting a pivot pin to be inserted through the elements to connect the feeder assembly to the combine frame. The self-aligning characteristic of the mounting assembly is even more apparent where the feeder assembly is being coupled to the frame of the combine on uneven ground conditions. The self-aligning features of the present invention furthermore facilitates connection of the feeder assembly to the combine frame without any specific angle of approach being required for aligning the apertures in the coupling elements. Another feature of the present invention is the ability to facilitate quick attachment and detachment of the feeder assembly to the combine frame with coupling elements which are economical to manufacture and durable in construction. Moveover, the profiled surfaces on the coupling elements inhibits the feeder assembly from falling upon removal of the pivot pin from the coupling elements.

Numerous other features and advantages of the present invention will become readily apparent from the following detailed description, the accompanying drawings, and the appended claims.

BRIEF DESCRIPTION OF THE DRAWINGS

FIG. 4 is a sectional view taken along line 4—4 of FIG. 2; and

FIG. 5 is a perspective view of one of a pair of releasable couplings of the coupling structure of the present invention.

DETAILED DESCRIPTION OF THE INVENTION

Figure 1:
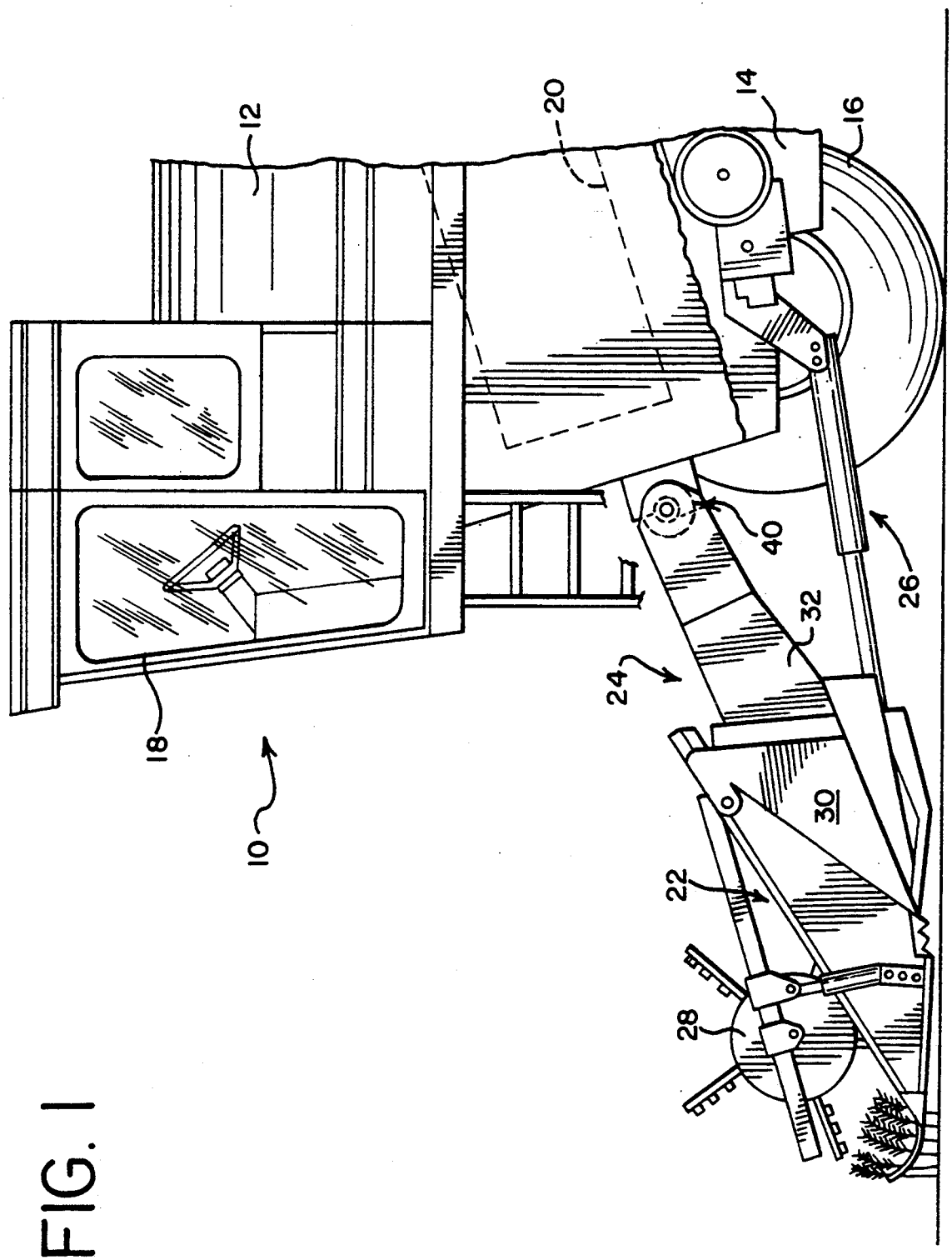
FIG. 1 is a side elevational view of an agricultural apparatus such as a combine with parts broken away and showing one form of the present invention mounted thereon.

While the present invention is susceptible of embodiment in various forms, there is shown in the drawings a preferred embodiment hereinafter described with the understanding that the present disclosure is to be considered as an exemplification of the invention, and is not intended to limit the invention to the specific embodiment illustrated.

Referring now to the drawings, wherein like reference numerals refer to like parts, throughout the several views, there is shown in FIG. 1 a self-propelled agricultural harvester or combine 10. The combine 10 is preferably of the type marketed by the assignee herein but it should be appreciated that the teachings of the present invention are equally applicable to other forms of agricultural harvesters without departing or detracting from the spirit and scope of the present invention. Combine 10 includes a body or housing 12 carried on a frame 14 and which is supported for movement across a field by wheels 16. The combine is powered by an engine (not shown) and controlled from an operator station 18. Combine 10 further includes a threshing assembly or apparatus 20 mounted within body 12.

At its forward end, the combine 10 is provided with a header assembly 22 which is connected to the combine frame 14 by a feeder assembly 24. As will be described in detail hereinafter, the feeder assembly 24 is pivotally connected to the combine frame 14. A linearly distendable driver 26 elevationally positions the header assembly 22 relative to the ground contour in a manner well known in the art. In a preferred embodiment, the linearly distendable driver 26 includes a hydraulically operated cylinder which is connected between the combine frame and the feeder assembly 24.

In the illustrated embodiment, the header assembly 22 includes a reel 28 mounted on a housing 30. The header assembly is further provided with a cutting mechanism (not shown) and an auger (not shown) which are likewise mounted on the housing 30. The header assembly 22 operates in a conventional manner for cutting and feeding crop materials to the feeder assembly 24.

The feeder assembly 24 includes a rigid housing 32 which envelopes a conveyor (not shown). The feeder housing 32 is connected at its forward end to housing 30 of the header assembly and is pivotally connected at its aft end to the combine frame 14. During operation, the feeder assembly 24 moves the crop materials rearwardly away from the header assembly 22 and introduces such crop materials to the threshing assembly 20.

Figure 2:
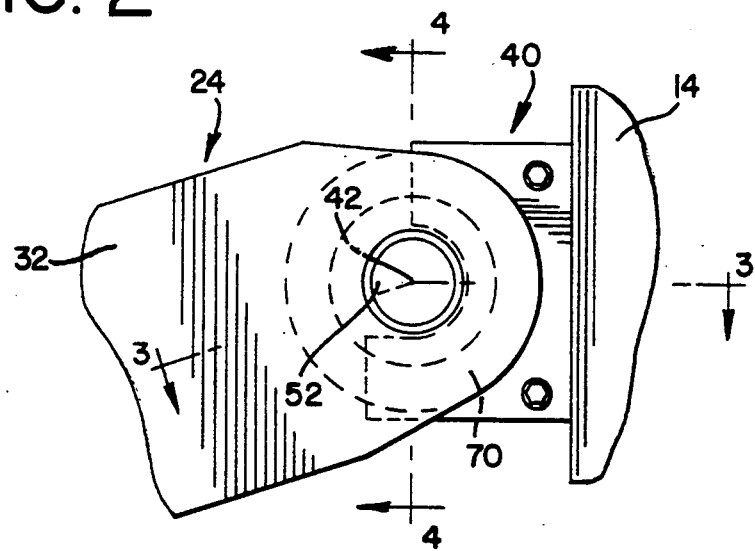
FIG. 2 is an enlarged side elevational view of the coupling structure of the present invention.

According to the present invention and as shown in FIGS. 1 and 2, a self-aligning coupling structure 40 releasably connects a rear end of the feeder assembly 24 to the combine frame 14. In the illustrated embodiment, the coupling structure 40 connects the rigid housing 32 of the feeder assembly 24 to the combine frame 14 for pivotal movement about a fixed axis 42 spaced a predetermined distance away from the combine frame 14.

Figure 3:
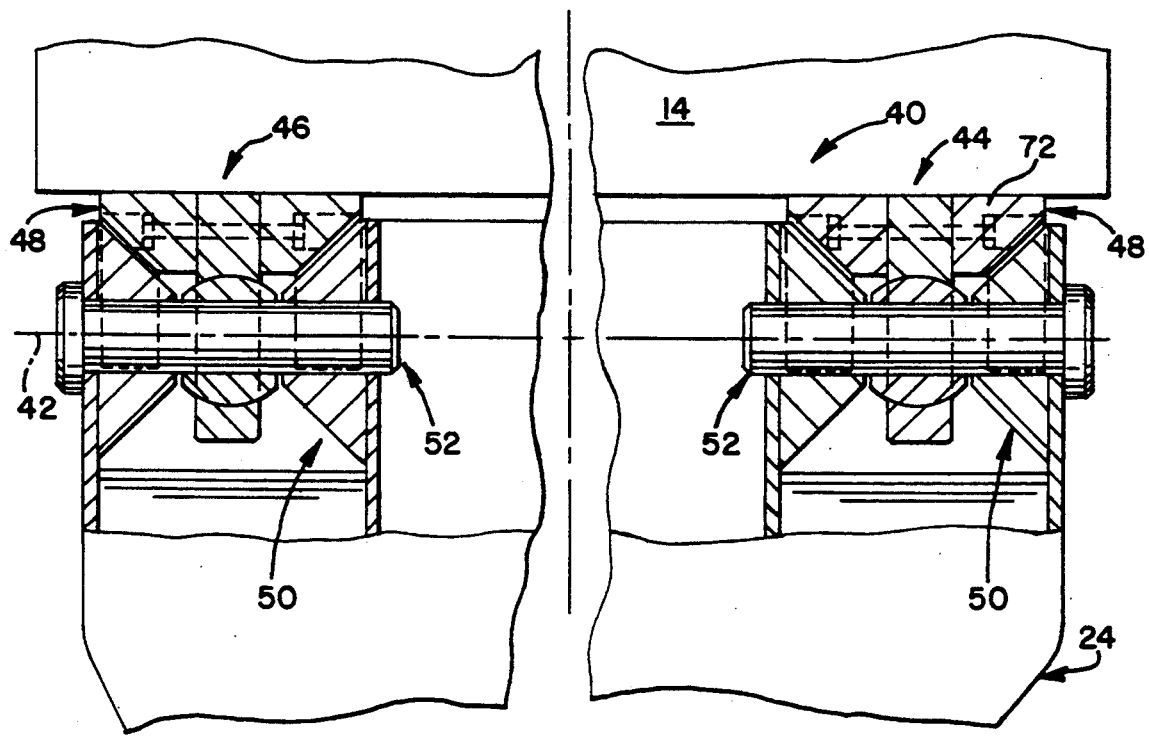
FIG. 3 is a sectional view taken along line 3—3 of FIG. 2.

Turning to FIG. 3, the coupling structure 40 includes a pair of releasable couplings 44 and 46. As shown, the couplings 44 and 46 are laterally spaced from each other by a predetermined distance and extend from opposite sides of the combine frame 14 and feeder assembly housing 32. Each releasable coupling 44, 46 preferably includes first and second complementary and self-aligning coupling elements 48 and 50. In the illustrated embodiment, coupling element 48 is suitably affixed to and projects forwardly from the frame 14, while coupling element 50 is suitably affixed to and projects rearwardly from the feeder assembly 24. Each coupling element 44, 46 further includes a pivot pin 52 which releasably and pivotally joins the elements 48 and 50 of the respective releasable coupling to each other when the feeder assembly 24 is to be assembled or connected to the frame 14. As shown, the pivot pin 52 of coupling element 44 is axially aligned with the pivot pin 52 of coupling element 46 so as to define the pivot axis 42 for the feeder assembly 24.

In the illustrated embodiment, the releasable couplings 44 and 46 comprising the self-aligning coupling structure 40 are substantially identical in structure to each other. Thus, only releasable coupling 44 will be discussed in detail with the understanding that releasable coupling 46 is substantially identical in structure and operation.

Turning to FIGS. 4 and 5, coupling element 48 of each releasable coupling is designed as a support trunnion 56 which is laterally spaced a predetermined distance from the longitudinal centerline of the frame 14. The support trunnion 56 is suitably affixed to and projects forwardly from the frame 14 of the combine. As shown, trunnion 56 defines an aperture 59 which is spaced a predetermined distance from the combine frame and is laterally disposed to permit passage of pin 52 from one lateral side of the trunnion to the opposite lateral side thereof. In the illustrated embodiment, trunnion 56 further includes a bushing 60 which is accommodated within aperture or socket 59. Preferably, bushing 60 is configured as a spherical ball bushing that is accommodated in aperture 59 of each trunnion 56 and is journalled about pin 52 when the feeder assembly 24 is connected at the frame 14. As will be appreciated, the spherical ball bushing 60 is snuggly or frictionally retained in a position to accommodate the lateral passing of pin 52 therethrough and is movable within the socket 59 to reduce the binding forces on pivot pin 52 when the feeder assembly 24 is connected to the frame 14.

Coupling element 50 of each releasable coupling 44 and 46 is preferably designed as a beating clevis 66 which is laterally spaced from the centerline of the feeder assembly a distance complementary to the lateral spacing of the support trunnion 56 to which it is to be releasably connected. Each bearing clevis 66 includes a pair of laterally spaced inner and outer walls 67 and 68 which rearwardly extend from and are rigidly joined to or integrally formed with the feeder housing 32 of the feeder assembly 24. Preferably, the inner wall 67 of each beating clevis 66 is laterally disposed relative to the feeder housing 32 as to not interfere with the delivery of crop materials advancing through and being exhausted into the threshing assembly 20 of the combine. The walls 67 and 68 of each bearing clevis 66 define axially aligned apertures 69 which permit passage of pin 52 through the bearing clevis when the feeder assembly 24 is connected to the frame 14 of the combine.

A salient feature of the present invention concerns the ability of the coupling elements 48 and 50 of each releasable coupling 44, 46 to engage with each other to effect self-alignment of the apertures 59 and 69 of the trunnion 56 and bearing clevis 66, respectively, thereby promoting the connection of the feeder assembly to the combine frame by making it easier to slide the pivot pin 52 between the coupling elements. The self-aligning feature of the present invention is effected by providing the complementary coupling elements 48 and 50 of each releasable coupling with complementary guide surfaces 70 and 80, respectively, which engage with each other to effect self-alignmnent of the apertures 59 and 69, both vertically and horizontally relative to each other, so as to facilitate passage of the pivot pin 52 through the aligned apertures 59, 69 thereby releasably connecting the feeder assembly 24 to the frame 14 for pivotal movement about the axis 42.

In the illustrated embodiment, the guide surface 70 on each support trunnion 56 has a simple geometric design which extends partially about and is centered upon the aperture defined by the respective support trunnion. As shown, guide surface 70 opens to an outer lateral side of the trunnion 56 and converges toward the aperture 59. As shown in FIGS. 2 and 5, the guide surface 70 is vertically disposed and extends rearwardly of and approximately 180° about the longitudinal axis of the pivot pin which connects the feeder assembly to the combine frame 14. That is, the guide surface 70 extends partially above, partially below and rearwardly of the pivot axis 42.

As shown in FIGS. 4 and 5 and to facilitate fabrication of the coupling element 48, the guide surface 70 is separately provided in a block structure 72. The block structure 72 having the guide surface 74 therein, is thereafter suitably affixed to a lateral side of the support trunnion 56. The simple geometric design of the guide surface 70 preferably includes a frustoconical surface or profile which converges toward the aperture 59.

To further facilitate self-alignment of the coupling elements 48 and 50 upon connection of the feeder assembly 24 to the combine frame 14, each support trunnion 56 may further include another guide surface 74 disposed on an opposite or inner lateral side of the support trunnion. Guide surface 74 is a mirror image of guide surface 70. That is, guide surface 74 likewise has a frusto-conical profile which converges toward aperture 59. In the illustrated embodiment, guide surface 74 is preferably embodied in a block structure 76 which is suitably connected to a lateral side surface of the support trunnion 56.

In the illustrated embodiment, the guide surface 80 on each bearing clevis 66 likewise has a simple geometric design which extends about and is centered upon the aperture 69 defined by the bearing clevis. As shown, guide surface 80 extends inwardly toward the center of the feeder assembly from the side wall 68 and converges toward the aperture 69. The guide surface 80 preferably has a frusto-conical configuration extending about its outer surface. Suffice it to say, the outer surface of the guide surface 80 is complementary to the guide surface 70 on the respective support trunnion so as to create a mating or engaging relationship therebetween when the feeder assembly 24 is to be coupled to the frame 14 of the combine.

To further facilitate self-alignment of the coupling elements 48 and 50 upon connection of the feeder assembly 24 to the combine frame 14, each bearing clevis 66 may further include an inner guide surface 84 extending toward guide surface 80 from the inner wall 67 of each bearing clevis 66. Guide surface 84 is substantially similar to guide surface 80 and, more importantly, has a profile similar to guide surface 74 on the support trunnion 56 so as to facilitate self-alignment of the apertures 59 and 69 of the coupling elements upon connection of the feeder assembly 24 to the combine frame 14.

In the embodiment illustrated, guide surfaces 70, 74 on coupling element 48 preferably opens to the front of the combine frame to readily accommodate and receive guide surfaces 80, 84, respectively, on coupling element 50. As the coupling elements 48 and 50 of the releasable couplings are brought together, the radial profiles on the guide surfaces provided on each of the coupling elements promote self-alignment of the apertures 59 and 69, thereby facilitating passage of the pin 52, therethrough to connect the feeder assembly 24 to the combine frame 14. Notably, extending the guide surfaces 70, 74 on the support trunnion beneath the axis of the pivot pin 52 inhibits the bearing clevis and, thus, the feeder assembly from falling after the pivot pin has been removed from the coupling.

When the feeder assembly 24 is to be coupled to the combine frame 14, the guide surfaces on the coupling elements facilitate alignment of the apertures 59 and 64, although the feeder assembly or combine may be arranged on uneven ground conditions. In effect, the guide surfaces on the coupling elements of each releasable coupling enhance the ability to align the apertures 59 and 69, notwithstanding initial misalignment of the feeder assembly relative to the combine frame. As will be appreciated, the simple geometric profiles on the guide surfaces of the coupling elements imparts both vertical and horizontal forces to the couplings as they are brought together to facilitate alignment of the apertures and thereby promote coupling of the feeder assembly to the combine frame. The spherical bushings 60 associated with the coupling elements furthermore facilitates passage of the pivot pin 52 and reduces binding forces on the releasable coupling during assembly and operation of the feeder assembly.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the spirit and scope of the claims.

What is claimed is:

1. An agricultural harvester including a main body, a feeder assembly with a header assembly connected to a forward end thereof, and a self-aligning coupling assembly for releasably connecting a rear end of the feeder assembly to the main body of the harvester for vertical movement about a fixed axis, said coupling assembly comprising:

at least two support trunnions which are laterally spaced apart a predetermined distance from each other and which are fixed to and project from opposite sides of the main body of the harvester, each support trunnion defining an aperture arranged a predetermined distance from the main body, each support trunnion further including guide surfaces provided on opposite lateral sides of each trunnion, each guide surface having a profiled configuration extending partially above, partially below and rearwardly of a pivot axis defined by said aperture; and at least two bearing clevises which are laterally spaced apart a distance complementary to the lateral spacing of said support trunnions, said bearing clevises being affixed to and projecting rearwardly from opposite sides of the feeder housing, with each bearing clevis defining an aperture and guide surfaces provided on opposite lateral sides thereof, and wherein each guide surface on the bearing clevises has a profiled configuration which is complementary to and cooperates with the respective guide surface on the support trunnions upon assembly of the feeder assembly to the main body to self-align the apertures of the respective trunnions and bearing clevises thereby facilitating passage of a pivot pin therethrough so as to pivotally interconnect the feeder assembly and the main frame of the harvester.

2. The agricultural harvester according to claim 1 wherein each support trunnion of said coupling assembly further includes a bushing arranged within the aperture defined by each trunnion.

3. The agricultural harvester according to claim 1 wherein the profiled configuration on the guide surfaces of each support trunnion includes a partial frusto-conical configuration.

4. The agricultural harvester according to claim 1 wherein the profiled configuration on the guide surfaces of each beating clevis includes a frusto-conical configuration.

5. An agricultural harvester including a wheel supported main frame, a feeder assembly including a feeder housing connected to the main frame, and a releasable self-aligning mounting assembly between the rear end of the feeder housing and the main frame for permitting vertical movement of said feeder assembly about a generally horizontal axis, said mounting assembly comprising:

a pair of laterally spaced trunnions extending forwardly from opposite sides of the main frame, each trunnion defining a laterally disposed aperture spaced from the main frame and a guide surface extending partially about said aperture and opens to a lateral side of the respective trunnion, and wherein said guide surface is centered on and converges toward the aperture; and a pair of bearing clevises which extend rearwardly from opposite sides of and are affixed to the feeder housing, said pair of beating clevises being laterally spaced apart a distance complementary to the distance separating the support trunnions, and with each bearing clevis defining a laterally disposed aperture and a guide surface centered on and converging from a lateral side of the respective clevis toward the aperture in the respective clevis so as to mate with the guide surface on a respective trunnion upon assembly of the feeder assembly to the main frame whereby the apertures of a respective trunnion and clevis self-align both vertically and horizontally relative to each other to facilitate passage of a pivot pin through said apertures to define an axis of rotation for said feeder assembly.

6. The agricultural harvester according to claim 5 wherein the releasable mounting assembly further includes a spherical ball bushing provided in combination with each trunnion.

7. The agricultural harvester according to claim 5 wherein each trunnion of the releasable mounting assembly further includes another guide surface which is centered on and extends partially about said aperture, with said another guide surface opening to an opposite lateral side of said trunnion and converging toward the aperture of the respective trunnion.

8. The agricultural harvester according to claim 7 wherein each clevis of said mounting assembly further includes another guide surface which is centered on and converges from an opposite lateral side of the respective clevis toward the aperture therein so as to mate with said another surface on a respective trunnion to further facilitate self-alignment of the apertures in the trunnions and the clevises relative to each other thereby promoting the passage of the pivot pin therethrough.

9. The agricultural harvester according to claim 5 wherein the guide surface on each trunnion of the releasable coupling assembly is generally vertically disposed and extends rearwardly of and approximately 180° about the longitudinal axis of said pivot pin.

10. A self-propelled combine having a wheeled frame for supporting a threshing assembly, a header assembly for cutting and feeding crop materials to a feeder assembly which moves the crop materials rearwardly away from the header assembly and introduces such crop materials to the threshing assembly, said feeder assembly including a hollow rigid feeder housing, and a self-aligning mounting assembly for coupling the rear end of the feeder assembly to the frame for pivotal movement about a fixed axis, said mounting assembly comprising:

a pair of releasable couplings laterally spaced from each other on opposite sides of the frame and the feeder housing, each releasable coupling including first and second complementary coupling elements, one of which is affixed to the frame and the other of which is fixed to the feeder housing, with the first coupling element of each releasable coupling having a partial frusto-conical surface configuration which, upon assembly of the feeder assembly to the combine frame engages and coacts with a complementary guide surface configuration on the second coupling element of the respective releasable coupling to effect self-alignment of the apertures defined by each of the coupling elements both vertically and horizontally relative to each other so as to facilitate passage of a pivot pin through the aligned apertures thereby releasably connecting the feeder assembly to the frame for pivotal movement about the axis of the pivot pin.

11. The combine according to claim 10 wherein each releasable coupling further includes a spherical ball bushing which journals the pivot pin upon connection of the feeder assembly to the frame.

12. The combine according to claim 10 wherein the guide surface on the first coupling element of each releasable coupling includes slanted surface configurations provided on opposite lateral sides of the first coupling element with a predetermined lateral spacing therebetween, with each slanting surface configuration being centered upon and converging toward the aperture defined by said first coupling element.

13. The combine according to claim 12 wherein the slanted surface configurations on opposite lateral sides of the first coupling element extend in a generally vertical orientation approximately 180° rearwardly of and about the axis of the pivot pin to define an opening thorough which the second coupling element of each releasable coupling extends to facilitate assembly of the feeder assembly to the frame of the combine.

14. A self-propelled combine having a wheeled frame for supporting a threshing assembly, a header assembly for cutting and feeding crop materials to a feeder assembly which moves the crop materials rearwardly away from the header assembly and introduces such crop materials to the threshing assembly, said feeder assembly including a hollow rigid feeder housing, and a self-aligning mounting assembly for coupling the rear end of the feeder assembly to the frame for pivotal movement about a fixed axis, said mounting assembly comprising:

a pair of releasable couplings laterally spaced from each other on opposite sides of the frame and the feeder housing, each releasable coupling including first and second complementary coupling elements, one of which is affixed to the frame and the other of which is fixed to the feeder housing, each coupling element of the releasable couplings having complementary guide surfaces thereon for engagement with each other to self-align apertures defined by each of the coupling elements both vertically and horizontally relative to each other so as to facilitate passage of a pivot pin through the aligned apertures thereby releasably connecting the feeder assembly to the frame for pivotal movement about the axis of the pivot pin with the guide surface on the first coupling element of each releasable coupling including slanted surface configurations provided on opposite lateral sides of the first coupling element with a predetermined lateral spacing therebetween, with each slanting surface configuration being centered upon and converging toward the aperture defined by said first coupling element, and wherein the guide surface on the second coupling element of each releasable coupling includes slanted surface configurations provided on opposite lateral sides of the second coupling element with lateral spacing therebetween which is complementary to the predetermined lateral spacing between the slanted surface configurations on the first coupling element, with each slanting surface configuration on the second coupling element being centered upon and converging toward the aperture defined by the second coupling element.

* * * * *